(12) United States Patent
Cook et al.

(10) Patent No.: US 6,469,129 B1
(45) Date of Patent: Oct. 22, 2002

(54) PROCESS FOR CROSSLINKED BRANCHED POLYESTERS

(75) Inventors: Phillip M. Cook, Kingsport, TN (US); Michael D. Hamlin, Brockport, NY (US); Lanny C. Treece; George G. Mayfield, both of Kingsport, TN (US); Charles R. Tomlinson, Blountville, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/558,604

(22) Filed: Apr. 26, 2000

Related U.S. Application Data

(60) Provisional application No. 60/132,095, filed on Apr. 30, 1999, and provisional application No. 60/131,100, filed on Apr. 26, 1999.

(51) Int. Cl.$^7$ .............................. C08G 63/48; C08F 2/00
(52) U.S. Cl. ................... 528/295.5; 528/272; 528/296; 528/298; 528/302; 528/306; 528/308; 528/308.6; 525/437; 525/444; 526/65; 526/66; 426/3
(58) Field of Search .............................. 528/272, 295.5, 528/296, 298, 302, 306, 308, 308.6; 525/437, 444; 526/65, 66; 426/3

(56) References Cited

U.S. PATENT DOCUMENTS

| | | |
|---|---|---|
| 3,522,214 A | 7/1970 | Crawford et al. |
| 3,535,280 A | 10/1970 | Krefeld-Uerdinger et al. |
| 3,695,327 A | 10/1972 | Widmer |
| 4,096,122 A | 6/1978 | Schade et al. |
| 4,237,261 A | 12/1980 | Kawamura et al. |
| 4,319,017 A | 3/1982 | Kosanovich et al. |
| 4,415,721 A | 11/1983 | Kosanovich et al. |

(List continued on next page.)

FOREIGN PATENT DOCUMENTS

| | | |
|---|---|---|
| DE | 2232877 | 1/1974 |
| DE | 259198 A | 8/1988 |
| GB | 1121936 | 5/1966 |
| JP | 9-124783 | 5/1997 |
| SU | 1269825 | 3/1985 |

OTHER PUBLICATIONS

Biehler, et al., "Small Laboratory Centrifugal Molecular Still," Analytical Chemistry, vol. 21(5): 638–640 (1949).

Kumar, et al. "Solution of Final Stages of Polyethylene Terephthalate Reactors Using Orthogonal Collocation Technique," Polymer Engineering and Science, vol. 24(3):194–204.

*Primary Examiner*—Samuel A. Acquah
(74) *Attorney, Agent, or Firm*—Bernard J. Graves, Jr., Esq.; Michael Blake

(57) ABSTRACT

A process for making a crosslinked branched polyester gel from at least two pregel compositions comprising:
a) reacting precursor repeat units formed from (1) at least one polyol having three or more hydroxyl groups or esters thereof, (2) at least one aliphatic or aromatic polyfunctional acid or ester thereof, or a mixture thereof; and (3) optionally at least one long chain aliphatic carboxylic acid or ester thereof, or aromatic monocarboxylic acid or ester thereof, or mixture thereof, to substantial completion in separate reactors to produce in a first reactor a first composition comprising a pre-gel having carboxyl end groups and to produce in a second reactor a second composition comprising a pre-gel having hydroxyl end groups,
b) combining the first and second compositions to form a mixture; and
c) processing the mixture in an extruder, a continuous processor, or a container to convert the mixture into a crosslinked branched polyester gel.

30 Claims, 1 Drawing Sheet

U.S. PATENT DOCUMENTS

| | | |
|---|---|---|
| 4,465,819 A | 8/1984 | Kosanovich et al. |
| 4,474,938 A | 10/1984 | Richardson et al. |
| 4,490,519 A | 12/1984 | Kosanovich et al. |
| 4,540,771 A | 9/1985 | Ambrose et al. |
| 5,302,255 A | 4/1994 | Dorai et al. |
| 5,616,681 A | 4/1997 | Itoh et al. |
| 5,677,415 A | 10/1997 | Bhatia |
| 5,714,553 A | 2/1998 | Kim et al. |
| 5,856,423 A | 1/1999 | Bhatia |
| 6,013,287 A * | 1/2000 | Bunczek et al. ............... 426/3 |
| 6,017,566 A * | 1/2000 | Bunczek et al. ............... 426/3 |

\* cited by examiner

PROCESS FOR CROSSLINKED BRANCHED POLYESTERS

This application claims the benefit of U.S. Provisional Application Serial No. 60/131,100, filed Apr. 26, 1999, and No. 60/132,095, filed Apr. 30, 1999, and both provisional applications are herein incorporated by this reference in their entireties.

FIELD OF THE INVENTION

This invention relates to an improved process for making crosslinked branched polyesters, and their use as a chewing gum base and in non-food applications.

BACKGROUND OF THE INVENTION

Aromatic polyesters such as poly(ethylene terephthalate) (PET) are high melting and which have a high degree of crystallinity, are widely used in various molding and extrusion applications. Such applications include films, sheeting, bottles, containers and the like. Aliphatic polyesters generally have low melting points and are therefore much less useful in typical industrial applications. However, it was recently reported that certain aliphatic polyesters based on monomers approved for food applications are useful as a chewing gum base. It would therefore be beneficial to provide for improved polyesters for chewing gum bases and for non-food applications and improved methods of making such materials.

The preparation of polyesters is described in a recent book by George Odian, *Principles of Polymerization*, $2^{nd}$ Edition, pages 102–105 (1981), John Wiley & Sons, NY. Branched or crosslinked polymers can be prepared by using at least some monomers having a functionality of at least three. An apparatus for making such branched polymers is shown on page 132 of this same reference.

Conventional stirred and heated tanks are generally desired because the equipment is commercially available and can provide economy of scale. Unfortunately, these reactors are not easily adapted for stirring very viscous fluids. Moreover, once gelation occurs, it is nearly impossible to discharge the gel from the reactor. During the process, as the crosslinking reactions ensue, the reaction mixture becomes very thick and eventually gels. As such, agitation is impaired and eventually stops. Because the gelled mass becomes non-homogeneous, heat transfer is severely impaired resulting in pocket charring. Furthermore, the uniformity of the gel is compromised. Due to the extremely high rate of increase in polydispersity and molecular weight near the gel point, control of the reaction is almost impossible in a conventional stirred tank reactor. Additionally, once gel formation starts, it is uncontrollable due to the exothermic nature of the reaction and the severe limitations on mixing at significantly high viscosity.

The reactive extrusion step used in conjunction with the stirred reactor above was believed to be suitable equipment for the crosslinking the polyester because of its capability to heat, agitate, and discharge extremely viscous materials. However, use of reactive extrusion to prepare crosslinked polyesters requires residence times much too along to be economical or suitable for large-scale manufacture. Such a process, requires the removal of water as it is formed in order to increase molecular weight. For example, approximately 5–15% by weight of the reaction mixture is yielded as water by the condensation polymerization reaction. To insure that such large amounts of water are removed, requires slower operation of the extruder, otherwise only a viscous liquid rather than a gel will exit the extruder. As such, extruder screws must be slowed down or the extruder lengthened. Additionally, the extrusion equipment needs to be designed and configured to allow for a significant range in viscosity of the reacting polymer mixture. The feed is a thin liquid (at the high reaction temperature present in the extruder) and the product is a thick gel. This added complexity and low throughput results in a correspondingly high cost to produce the product by the reactive extrusion process described herein.

WO 98/17123 (1998) and WO 98/17124 (1998) PCT publications to Wngley Jr. Company describe a gum base including at least one aliphatic polyester that is produced from glycerol, propylene glycol or 1,3-butylene glycol and an aliphatic dibasic acid containing 4 to 12 carbon atoms.

Nagata, M. et al, *Macromolecules*, Vol. 30, 6525 (1997) describe the synthesis and characterization of certain aliphatic polyesters based on pentaerythritol.

M. Nagata et al., *Reactive Functional Polymers*, Vol. 30, 165 (1996) describe the synthesis and enzymatic degradation of certain aliphatic polyesters based on glycerol and aliphatic dibasic acids containing 6 to 16 carbon atoms.

U.S. Pat. Nos. 4,319,017, 4,415,721 and 4,465,819 to Kosanovich et al disclose a process to produce thermotropic linear polyesters of aromatic dicarboxylic acids and diphenols. A two-step process is presented wherein a pre-polymer is prepared in the first step and subsequently reacted in a wiped-film reactor capable of high shear stress.

None of the references disclose a process for making a crosslinked branched polyester gel. Since the prior art processes are not adaptable to large scale manufacturing, premature gelation is much more likely to occur. Thus, it has been discovered herein a process that addresses the problem of premature gelation by providing a polyol-rich reaction mixture to make a pre-gel composition having hydroxyl end groups. Similarly, a carboxylic acid-rich reaction mixture is provided to form a pre-gel composition having carboxyl end groups. The pre-gel composition having carboxyl end groups and the pre-gel composition having hydroxyl end groups are mixed and processed in an extruder, continuous processor, or container to convert the mixture into a crosslinked polyester gel. Unlike the prior art process, the pre-gel compositions formed from the process individually do not form a gel even after days of being heated in a conventional stirred tank reactor at elevated temperatures.

The present invention produces in separate reactors a pre-gel composition having carboxyl end groups and a pre-gel composition having hydroxyl end groups, wherein the pre-gel compositions are subsequently mixed, processed and converted into a crosslinked polyester gel.

Some advantages of the present process of the invention are that because neither the pre-gel with carboxyl end groups nor the pre-gel with hydroxyl end groups will gel by themselves, both pre-gels can be substantially reacted to completion. Only minimal mixing is required prior to processing the mixture to form a crosslinked polyester pre-gel. Therefore, the residence time and temperature of the extruder can be substantially reduced and throughput improved as compared to the prior art. Furthermore, the water extracted content of the crosslinked polyester in this process is less than about 5 weight % and preferably less than about 1 weight %.

SUMMARY OF THE INVENTION

The present invention provides a process for making a crosslinked branched polyester from at least two pre-gel compositions. More specifically, the process can be used to prepare crosslinked branched aliphatic polyesters, which are particularly useful in food applications such as chewing gum bases, or the process can be used to prepare aromatic or non-biodegradable polyesters, which are useful in non-food applications, including cosmetics, baking agents, customized emulsions, inks, pigments and the like.

In an embodiment, the invention provides a process for making a crosslinked branched polyester gel from at least two pre-gel compositions comprising:

a) reacting precursor repeat units comprising (1) at least one polyol having three or more hydroxyl groups or esters thereof, (2) at least one aliphatic or aromatic polyfunctional acid or ester thereof, or a mixture thereof; and (3) optionally at least one long chain aliphatic carboxylic acid or ester thereof, or aromatic monocarboxylic acid or ester thereof, or mixture thereof, to substantial completion in separate reactors to produce in a first reactor a first composition comprising a pre-gel having carboxyl end groups and to produce in a second reactor a second composition comprising a pre-gel having hydroxyl end groups, b) combining the first and second compositions to form a mixture; and c) processing the mixture in an extruder, a continuous processor, or a container to convert the mixture into a crosslinked polyester gel.

In another embodiment, the invention provides a process for making a crosslinked branched polyester gel from at least two pre-gel compositions comprising:

a) reacting precursor repeat units comprising (1) at least one polyol having two or more hydroxyl groups or esters thereof, (2) at least one aliphatic or aromatic polyfunctional acid or ester thereof, or a mixture thereof having at least three functional groups; and (3) optionally at least one long chain aliphatic carboxylic acid or ester thereof, or aromatic monocarboxylic acid or ester thereof, or mixture thereof, to substantial completion in separate reactors to produce in a first reactor a first composition comprising a pre-gel having carboxyl end groups and to produce in a second reactor a second composition comprising a pre-gel having hydroxyl end groups, b) combining the first and second compositions to form a mixture; and c) processing the mixture in an extruder, a continuous processor, or a container to convert the mixture into a crosslinked polyester gel.

In another embodiment, the invention provides a crosslinked branched aliphatic biodegradable gum base and chewing gum composition made by the process of the present invention.

Additional advantages of the invention will be set forth in part in the description, which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

The accompanying drawing, which is incorporated in and constitute a part of this specification, illustrate several embodiments of the invention and together with the description, serve to explain the principles of the invention.

DETAILED DESCRIPTION OF THE INVENTION

Figure 1:
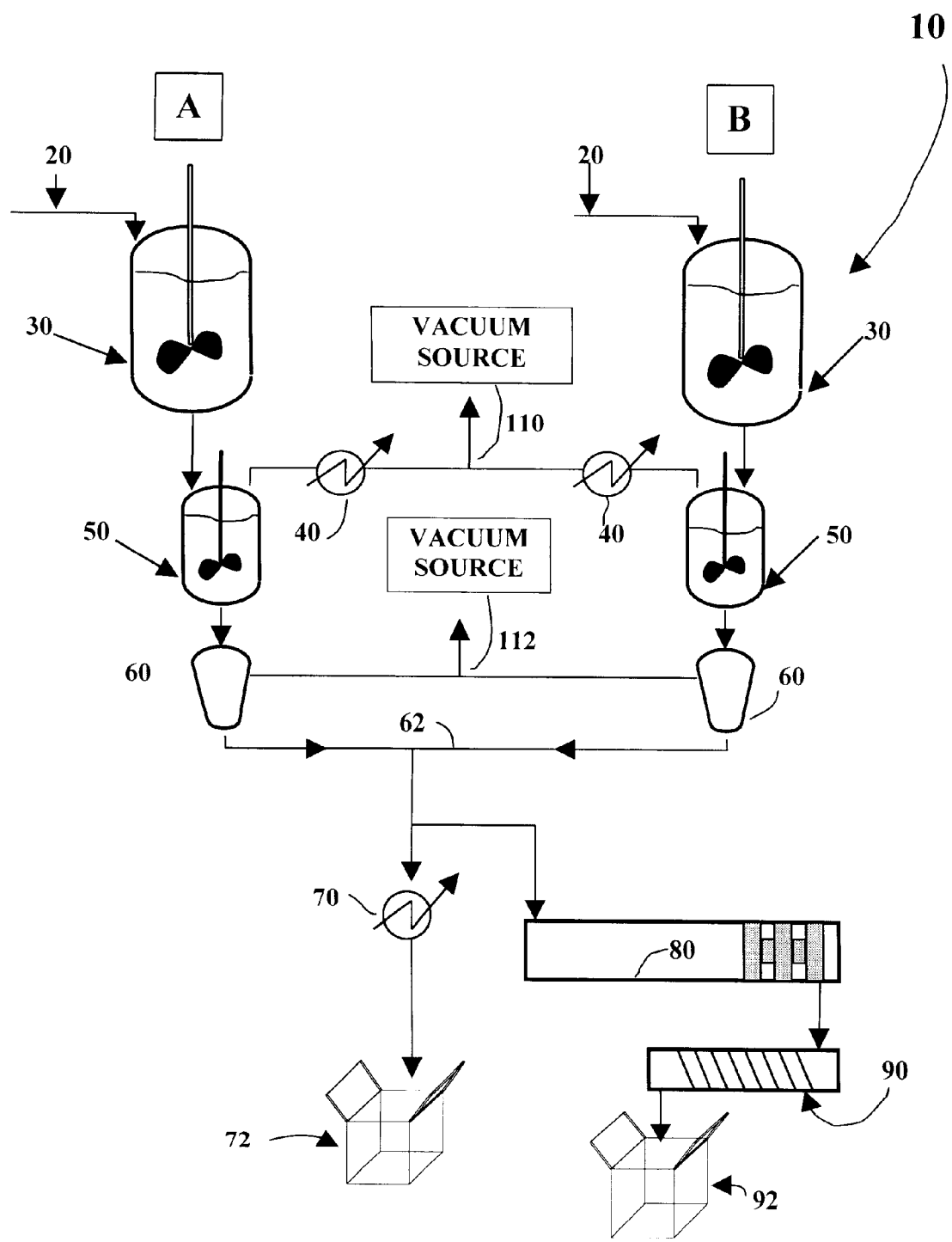
FIG. 1 schematically illustrates the process of the present invention.

The present invention may be understood more readily by reference to the following detailed description of preferred embodiments of the invention and the Examples included therein.

It must be noted that, as used in the specification and the appended claims, the singular forms "a" "an" and "the" include the plural referents unless the context clearly dictates otherwise.

Ranges may be expressed herein as from "about" one particular value and/or to "about" another particular value. When such a range is expressed, another embodiment includes from the one particular value and/or to the other particular value. Similarly, when the values are expressed as approximations, by use of the antecedent "about," it will be understood that the particular value forms another embodiment. It will be further understood that the endpoints of each of the ranges are significant both in relation to the other endpoint, and independently of the other endpoint.

A weight percent of a component, unless specifically stated to the contrary, is based on the total weight of the formulation or composition in which the component is included.

The molecular weight ranges herein refer to the weight-average molecular weight.

"Optional" or "optionally" means that the subsequently described event or circumstance may or may not occur, and that the description includes instances where said event or circumstance occurs and instances where it does not. For example, the phrase "optionally substituted lower alkyl" means that the lower alkyl group may or may not be substituted and that the description includes both unsubstituted lower alkyl and lower alkyl where there is substitution.

A "Torr" is equivalent to 1 mm Hg absolute, which is equivalent to 1,000 $\mu$Hg absolute.

The term "L/D" or "L:D" is meant to define the extruder barrel length to diameter ratio.

In an embodiment, the invention provides a process for making a crosslinked branched polyester gel from at least two pre-gel compositions comprising:

a) reacting precursor repeat units comprising (1) at least one polyol having three or more hydroxyl groups or esters thereof, (2) at least one aliphatic or aromatic polyfunctional acid or ester thereof, or a mixture thereof; and (3) optionally at least one long chain aliphatic carboxylic acid or ester thereof, or aromatic monocarboxylic acid or ester thereof, or mixture thereof, to substantial completion in separate reactors to produce in a first reactor a first composition comprising a pre-gel having carboxyl end groups and to produce in a second reactor a second composition comprising a pre-gel having hydroxyl end groups, b) combining the first and second compositions to form a mixture; and c) processing the mixture in an extruder, a continuous processor, or a container to convert the mixture into a crosslinked branched polyester gel.

Within this embodiment, the aliphatic or aromatic polyfunctional acid or ester thereof has two functional groups.

In another embodiment, the invention provides a process for making a crosslinked branched polyester gel from at least two pre-gel compositions comprising:

a) reacting precursor repeat units comprising (1) at least one polyol having two or more hydroxyl groups or esters thereof, (2) at least one aliphatic or aromatic polyfunctional acid or ester thereof, or a mixture thereof having at least three functional groups; and (3) optionally at least one long chain aliphatic carboxylic acid or ester thereof, or aromatic monocarboxylic acid or ester thereof, or mixture thereof, to substantial completion in separate reactors to produce in a first reactor a first composition comprising a pre-gel having carboxyl end groups and to produce in a second reactor a second composition comprising a pre-gel having hydroxyl end groups, b) combining the first and second compositions to form a mixture; and c) processing the mixture in an extruder, a continuous processor, or a container to convert the mixture into a crosslinked branched polyester gel.

Within this embodiment, the aliphatic or aromatic polyfunctional acid or ester has three functional groups.

In the above embodiments, the number of hydroxyl groups or esters on the polyol may be two or more, and the number of functional groups on the aliphatic or aromatic polyfunctional acid or ester thereof may be three or more. Alternatively, the number of hydroxyl groups or esters on the polyol may be three or more, and the number of functional groups on the aliphatic or aromatic polyfunctional acid or ester thereof may be two or more. In yet another alternative, the number of hydroxyl groups or esters on the polyol may be three or more, and the number of functional groups on the aliphatic or aromatic polyfunctional acid or ester thereof may be three or more. In counting the number of functional groups, these are functional groups that react with the hydroxyls or ester thereof. Any of the above combinations or any variation thereof will result in the desired pre-gel of the invention. However, the desired pre-gel will not be obtained if the number of hydroxyl groups or esters on the polyol is two and the number of functional groups on the long chain aliphatic or aromatic polyfunctional acid or ester thereof is two. Other monomers may be added during the reaction process without detrimentally affecting the production of the pre-gel.

In the preparation of the pre-gel composition having carboxyl end groups and the pre-gel composition having hydroxyl end groups, the reactions are carried out in stirred tank reactors, batch reactors, or continuous reactors to produce in separate reactors a pre-gel composition having carboxyl end groups and a pre-gel composition having hydroxyl end groups. For purposes of convenience, simplicity, and large-scale manufacture, it is most advantageous to utilize a single piece of equipment into which the repeat units can be fed as two or more component mixtures.

Stirred tank reactors, which are also known as batch reactors, are well known and are described in Principles of Polymerization, at page 132, and are commercially available from De Dietrich USA Headquarters, Inc., in Union, N.J. Continuous reactors are also well known in the art and commercially available from Pfaudler in Rochester, N.Y. Continuous stirred reactors may be baffled and or segmented into more than one stage and are described and illustrated in Perry's Chemical Engineering Handbook, pp-4.26, figure 4-4(e), 6th Ed., McGraw Hill.

Suitable reaction temperatures for the reactor in step (a) are preferably from about 100 to about 300° C., more preferably from about 150 to about 250° C. and most preferably from about 170 to about 210° C. Pressure ranges for the reactor in step are from about 1000 to about 0.1 mm Hg, preferably from about 800 to about 0.1 mm Hg more preferably from about 800 to about 5 mm Hg, and most preferably at ambient pressure, i.e., from about 800 to about 720 mm Hg.

Within this embodiment, the first and second compositions are combined in step (b) to form a mixture and processed in an extruder, continuous processor or container in step (c) to convert the mixture to a crosslinked polyester gel.

Preferred temperature ranges for processing the mixture in an extruder or continuous processor to form a crosslinked branched polyester gel in step (c) are from about 25 to about 300° C., more preferably from about 60–150° C., most preferably from about 150 to about 225° C. Preferred pressure ranges are from about 1000 to about 0.1 mmHg, more preferably from about 800 to about 0.1 mm Hg, and most preferably from about 800 to about 720 mm Hg. Preferred times are less than about 30 minutes, more preferably less than about 15 minutes, and most preferably less than about 5 minutes.

When the mixture from step (c) is processed in a container to convert the mixture into a crosslinked polyester gel, the material is directed to an externally heated container, which is preferably heated to a temperature of from about 50 to about 150° C. for a period of about 30 minutes to about two weeks, more preferably the container is heated to a temperature of from about 100 to about 150° C. for a period of about 1 to about 10 hours. The times and temperatures herein are dependent. The crosslinking temperatures and times for processing the mixture of pre-gel composition having carboxyl end groups and pre-gel composition having hydroxyl end groups are dependent on the extent to which the pre-gel compositions are reacted. In the present embodiment, the times and temperatures are based on pre-gels that are reacted to at least 95% completion.

Suitable containers for maintaining the crosslinked polyester gel include a box, drum, tray, or molds formed from a polyester, polyolefin, polyether, cellulose-based, metal, or a combination thereof. Other suitable containers include a tote or bag, which can be prepared from materials such as polyester, polyether, polyolefin, or a mixture thereof. A plastic bag liner is also a suitable product container for the crosslinked polyester gel as long as the temperature used to achieve gelation is below the glass transition temperature ("Tg") of the plastic used to make the bags.

In another embodiment, the process comprises additional reactors for the first and second pre-gel compositions, wherein the reactors are operated at reduced pressures.

Preferred reduced pressures in the additional reactors are preferably from about 720 to about 0.1 mm Hg, and most preferably from about 720 to about 5 mm Hg (5 Torr).

In another embodiment, the process comprises a degasser. Suitable degassers include spray and tray degassers, both of which are well known and described by Burrows in *Molecular Distillation,* chapter 7, page 135–138, Oxford University Press, London (1960). The optional degasser is used only if the extent of reaction in step (a) is high enough in a batch reaction that the pre-gel compositions will not be stripped off by the vacuum degasser. Thus, allowing the reaction of the pre-gel composition having hydroxyl end groups and/or the pre-gel composition having carboxyl end groups in a reactor under vacuum after sufficient molecular weight is attained that will not allow the product to vaporize under vacuum. The degasser can optionally be provided with a recirculation loop configuration with the reactor, particularly if the reactor is not operated under vacuum.

Preferred degasser pressure ranges are less than about 100 mmHg, more preferably about less than 10 mmHg and most preferably about less than 1 mmHg (1 Torr).

In another embodiment, the process comprises cooling the temperature of the mixture of the first and second compositions prior to directing to the heated product container. Preferred cooling temperatures are from about 50 to about 300° C., more preferably from about 80 to about 200° C., and most preferably from about 80–150° C.

In yet another embodiment, the process comprises processing the crosslinked branched polyester gel in a cooling apparatus or an additional extruder to lower the temperature of the crosslinked gel. The temperature is preferably lowered to from about 25 to about 150° C., more preferably from about 25 to about 100° C., and most preferably from about 25 to about 60° C. The crosslinked polyester gel from this embodiment may be directed to a container.

In another embodiment, the process comprises directing the mixture of the first and second compositions to a wiped film still apparatus or centrifugal still apparatus and reacting further prior to converting the mixture into a crosslinked gel.

In another embodiment, the crosslinked branched polyester gel further comprises aromatic linkages. The aromatic linkages are formed by reaction of an aromatic carboxylic acid, or ester thereof, with hydroxyl groups to form ester linkages. The aromatic moiety may be monofunctional or polyfunctional having a functionality of one to four. The aromatic carboxylic acid, or ester thereof, may be used to prepare the hydroxyl end-capped pre-gel and/or the carboxyl-end capped pre-gel.

Wiped film still apparatuses and other similar devices are described by Burrows in *Molecular Distillation,* Oxford University Press, London, 1960 (esp. ch. 1 (pp. 1–12) and ch. 7 pp. 135–161) and are commercially available from commercial sources such as LCI, UIC or CANSLER.

A centrifugal molecular still (centrifugal still) apparatus is described by Biehler et al. al., *Analytical Chemistry,* 2, 638, (1940). Furthermore, a 60-inch "flower-pot" still developed by Hickman is also a suitable still for the process herein. Centrifugal molecular stills based on the Hickman design, are described by Hickman, K. C. D., *Industrial Engineering Chemistry,* 39, 686, (1947), and manufactured by Myers Vacuum Repair Service, Inc., Kittanning, Pa.

Either of the above stills can optionally be configured with an internal U-shaped tube condenser and/or a degasser.

In another embodiment, the process comprises reacting repeat units formed of (1) glycerol, (2) adipic acid and (3) palmitic acid.

Typical polyols contain 2 to 100 carbon atoms and have at least two or more hydroxy groups, or ester thereof. Preferred polyols include glycerol, pentaerythritol, polyglycol, polyglycerol, and the like or mixtures thereof. An even more preferred polyol is glycerol. Suitable esters of glycerol include glycerol palmitate, glycerol sebacate, glycerol adipate, triacetin tripropionin and the like. The polyol is present in the range of from about 20% to about 30% weight of the reaction mixture, more preferably from about 20% to about 26% weight of the reaction mixture.

Preferred aliphatic polyfunctional acids having at least two functional groups include saturated and unsaturated acids containing about 2 to about 100 carbon atoms, or ester thereof, more preferably 4 to 20 carbon atoms and most preferably 4 to 18 carbon atoms. Even more preferred aliphatic polyfunctional acids include malonic, succinic, tartaric, malic, citric, fumaric, glutaric, adipic, pimelic, sebacic, suberic, azelaic, and the like acids, or mixtures thereof. The most preferred aliphatic polyfunctional acid is adipic acid. Other aliphatic polyfunctional acids may be dicarboxylic acids containing a $C_3$ to $C_6$ cyclic structure and positional isomers thereof, and include cyclohexane dicarboxylic acid, cyclobutane dicarboxylic acid or cyclopropane dicarboxylic acid. Preferred aromatic polyfunctional acids having at least two functional groups include the terephthalic, isophthalic, trimellitic, pyromellitic and naphthalene 1,4-, 2,3-, and 2,6-dicarboxylic acids. The aliphatic polyfunctional acid or aromatic polyfunctional acid are present in the range of from about 40% to about 65% weight of the reaction mixture, more preferably from about 44% to about 60% weight of the reaction mixture.

Preferred monohydroxy alcohols have 1 to 20 carbon atoms, and most preferably 12–20 carbon atoms. Typical monohydroxy alcohols include lauryl alcohol, myristyl alcohol, cetyl alcohol, stearyl alcohol and the like. The monohydroxy alcohol is present in the range of from about 1 to about 30%.

The presence of a long chain aliphatic carboxylic acid or an aromatic monocarboxylic acid is helpful in controlling the degree of branching of the polyester produced and provides a desirable chewing gum base which has a desirable waxy feeling and excellent chewing characteristics.

Preferred long chain aliphatic carboxylic acids or aromatic monocarboxylic acid include those containing about 12 to 26 carbon atoms, or ester thereof, preferably 14 to 18 carbon atoms. Even more preferred long chain aliphatic carboxylic acids may be saturated or unsaturated. Typical saturated long chain aliphatic carboxylic acids include lauric, myristic, palmitic, stearic, arachidic, cerotic, and the like or mixtures thereof. Typical unsaturated long chain aliphatic carboxylic acids include dodecylenic, palmitoleic, oleic, linoleic, linolenic, erucic, and the like or mixtures thereof. The most preferred long chain aliphatic carboxylic acid is palmitic acid. Preferred aromatic monocarboxylic acids include benzoic, naphthoic, and substituted napthoic acids. Suitable substituted naphthoic acids include naphthoic acids substituted with linear or branched alkyl groups containing 1 to 6 carbon atoms such as 1-methyl-2 naphthoic acid and 2-isopropyl-1-naphthoic acid. The long chain aliphatic carboxylic acid or aromatic monocarboxylic acids are present in the range of from about 0% to about 70% weight of the reaction mixture, more preferably from about 15% to about 30% weight of the reaction mixture.

When a long chain aliphatic carboxylic acid such as palmitic acid is used during the initial reaction with the aliphatic or aromatic polyfunctional acid and glycerol component, a residual amount, of greater than 0% to less than about 10%, of palmitic acid is free or unreacted in the mixture, more preferably from about 3% to less than about 10% of free or unreacted palmitic acid in the mixture. An explanation for the unreacted palmitic acid has to do with the palmitic acid's initial reaction with glycerol and its later displacement by transesterification reactions that occur during the gelation process. For example, the ester of palmitic acid could react with a pendent acid group to yield a new adipate ester and free or unreacted palmitic acid. The amount of free or unreacted palmitic acid available at a single point is small, about less than 1 to about 5%, until gelation begins to occur. At the gelation point, the free or unreacted palmitic acid content begins to rise to from about 1% to about 10%, since gelation leads to very high viscosity and severely impedes diffusion of the palmitic acid. Since the palmitic acid cannot diffuse back into the mass of polymeric material or is trapped within the mass, it cannot find another hydroxyl group with which to react. Although, an excess of hydroxyl groups are present, many become essentially protected from further reaction because of the diffusional barrier caused by gelation. The presence of free or unreacted palmitic acid improves the compatibility of the crosslinked branched aliphatic biodegradable polyester with certain chewing gum additives, such as flavorants. Although, this discussion refers to the use of a specific long chain aliphatic carboxylic acid, palmitic acid, the same behavior is realized with the other long chain aliphatic carboxylic acids of the present invention.

In addition to the $C_3$ to $C_5$ polyol component, additional polyols, ionic species, oligomers or a derivative thereof may be used if desired. The amounts of these additional glycols or polyols may range from about 0% to about 50% weight percent of the reaction mixture. Preferred additional polyols or their derivatives thereof include propylene glycol, 1,3-butanediol, 1,3-propanediol, 1,4-butanediol, 1,6-hexanediol diethylene glycol, 1,4-cyclohexanediol, 1,4-cyclohexanedimethanol, neopentyl glycol, triacetin, trimethylolpropane, pentaerythritol, cellulose ethers, cellulose esters, such as cellulose acetate, sucrose acetate isobutyrate and the like. Preferred ionic species include calcium salts such as calcium carbonate, sodium chloride, magnesium sulfate, magnesium oxides, aluminum oxides, calcium sulfate, clays, talcs, aluminum silicates, titanium dioxides and the like.

It is well known to a person of ordinary skill in the art that to achieve a composition having carboxyl-rich and/or hydroxyl-rich end groups, a molar excess of the commensurate components must be utilized.

A catalyst is not required for the esterification and polycondensation steps used to prepare the crosslinked branched polyesters of this invention. Titanium catalysts such as titanium alkoxides are frequently used as ester exchange and polycondensation catalysts but titanium imparts undesirable discoloration to the polyesters of this invention. The presence of zinc and aluminum salts, excluding oxides, that may be dissolved by water in saliva will detract from the flavor of the polyester, if the polyester is used in food applications, such as a chewing gum base.

The terms "prepolymer" or "pre-gel" are defined herein as the state of the resin prior to gelation, that is prior to forming a gel or prior to reaching the gel point. At conversion well before the gel point, the resin is generally a liquid melt of low order polymers or oligomers. The term "gel point" is often described as the point wherein crosslinking is evident by the occurrence of gel formation or gelation in the polymerization process. As the reactants begin to react and give off water, the molecular weight of the chains begins to increase and the chains begin to branch. As the reaction continues and water is given off, the molecular weight begins to increase even more rapidly and bonds form between branched chains to form crosslinked structures. At some point during the progression of the reaction, the molecular weight becomes sufficiently large such that a gel begins to form. Such a gel has limited solubility in common organic or aqueous solvents. As the gel continues to react and water is given off, crosslinking increases and the consistency of the gel resembles a hard rubber and eventually a glass-like solid. When the gel point is reached in the polymerization process, one observes the visible formation of a "gel" or "insoluble polymer fraction."

The term "gel point" can also be described as the extent of reaction at which the reaction system looses fluidity as measured by the failure of an air bubble to rise in the mixture.

However, since it is impractical to measure the gel point using air bubbles, in this invention, the term gel point is used to describe the extent of reaction meant to define the point at which the batch of polymer becomes so difficult to agitate at temperatures of 150–200° C. that the batch of polymer begins to migrate up the agitator shaft of the reaction vessel or stirred tank. The gel is insoluble in solvents at elevated temperature under conditions where polymer degradation does not occur. The gel corresponds to the formation of an infinite network in which branched aliphatic polymer molecules have reacted with each other to form a macroscopic molecule. The gel is, in fact, considered as one molecule. The non-gel or sol portion of the polymer remains soluble in solvents. As the polymerization proceeds beyond the gel point, the amount of gel increases at the expense of the sol as more and more polymer chains in the sol become crosslinked to form gel. There is a dramatic physical change that occurs during the process of gelation. The reaction mixture is transformed into a polymer of infinite viscosity.

The term "sol" means the soluble content or non-gel portion of the gel prepared in a heated stirred tank. The "sol" in this invention is soluble in water.

In a preferred embodiment, from about 75 to 95% of the total water is removed during the reaction to form the two pre-gels. The remaining water, 5 to 25%, is removed after mixing and during post reaction to gelation.

The term "acid value," also known as acid number, is determined by weighing a sample of the crosslinked branched aliphatic polyester and titrating it with dilute potassium hydroxide in the presence of a pH sensitive color indicator or potentiometer. The acid value calculations are made based on the milligrams of potassium hydroxide/gram of crosslinked branched polyester. Preferred acid values are from about 10 to about 500 KOH /g polymer.

Referring to FIG. 1, the present invention schematically shows a reactor system 10, which may be operated either as a continuous process or a batch process. The system is illustrated as using two parallel lines, in which one line includes at least one feed material supply line 20 that provides compositions of pre-gel having hydroxyl end groups (designated as the "A" line) and the other line includes at least one feed material supply line 20 that provides compositions of pre-gel having carboxyl end groups (designated as the "B" line).

"A" and "B" pre-gel material feed are fed into a batch or continuous reactor 30 via the respective supply lines 20. The reactor system 10 may optionally include an additional stirred reactor 50 downstream of reactor 30 that is connected to and in fluid communication with a vacuum source 110. The vacuum source 110 is operated at a desired pressure, ideally at a pressure of from about 1000 to about 0.1 mmHg. In FIG. 1, the reactor 30 and stirred reactor 50 are illustrated as separate vessels, but it is contemplated that the two reactors 30, 50 can be formed as an integral unit. That is, reactor 30, for example, can be in fluid communication with the vacuum source 110 and also be a stirred reactor so that reactor 50 would not be required in this alternative design.

The reactor system 10 also may optionally include a condenser 40 in communication with the stirred reactor 50. As shown in FIG. 1, the condenser 40 is in fluid communication with both the stirred reactor 50 and the vacuum source 110.

Additionally, the reactor system 10 may include a vacuum spray or tray degasser 60 for degassing the pre-gel material discharged from the stirred reactor 50. The optional degasser 60 is shown connected to and in fluid communication with a vacuum source 112, which is operated at a reduced pressure, such as a pressure of from about 720 to about 0.1 mmHg After exiting the optional degasser 60, the pre-gel materials "A" and "B" are mechanically or statically mixed to provide a mixture, which is schematically indicated by merging at a mixing point 62 in FIG. 1. For one embodiment, the mixture may be directed into a cooler 70 to reduce the temperature of the mixture, or the mixture may be directed into a container 72 to convert the pre-gel mixture into a crosslinked branched polyester gel without interfacing with the cooler 70. Alternatively, for another embodiment, after "A" and "B" are mechanically or statically mixed, the resulting mixture may be further processed in an extruder or continuous processor 80 to form a crosslinked branched polyester gel. The crosslinked branched polyester gel from 80 may optionally be processed in a cooling apparatus or an additional extruder 90 to lower the temperature of the crosslinked polyester gel. The cooled material from the extruder 90 is directed into a container 92 and packaged using techniques known in the art.

FIG. 1 shows the "A" line and the "B" line operating in parallel and sharing the same compositions. As one skilled in the art will appreciate, the "A" and "B" lines can be operated independently of each other. In such an alternative embodiment, the independent lines can still be connected at a mixing point 62 as shown in FIG. 1 or the respective products of the two lines could be mixed in a separate third line (not shown), which would begin at the mixing point 62 and continue downstream from that point 62.

Biodegradable as used herein is meant to describe a polyester that is easily degradable and not highly crystallized. The mechanism of degradation is by de-esterification causing chain cleavage. The de-esterification process can occur either enzymatically, i.e., organisms, or by environmental factors such as exposure to water. The rate of biodegradation of the crosslinked branched polyesters can be determined by ASTM method D5209 (Determination of Biodegradation of Plastic Materials in the Presence of Municipal Sewage Sludge). The rate of biodegradation should be at least equal to the rate of degradation of kraft paper using the ASTM D5209 procedure. Upon visual observance of the biodegradation of the crosslinked branched polyester, the polyester exhibited low viscosity or a syrup-like consistency.

As previously stated, the crosslinked branched polyesters of the present invention can be used in food applications such as gum base formulations and/or chewing gum formulations and for non-food applications and improved methods of making such materials. In this regard, the polyesters can be used as elastomers and/or elastomeric plasticizers. As part of a gum base, the edible polyesters can comprise from abut 1% to about 80% by weight of the gum base. As part of the chewing gum, the crosslinked branched aliphatic biodegradable polyesters can comprise from about 0.1 to about 70% by weight of the chewing gum.

The crosslinked branched polyesters can be used in a variety of different chewing gum and base formulations. Chewing gum generally consists of a water insoluble gum base, a water soluble portion, and flavoring agents.

In one embodiment, a gum base is made according to the above-described processes comprising reacting precursor repeat units comprising (1) at least one polyol having three or more hydroxyl groups, or esters thereof, (2) at least one aliphatic polyfunctional acid or ester thereof; and (3) optionally at least one long chain aliphatic carboxylic acid or ester thereof.

Within this embodiment, the aliphatic polyfunctional acid or ester thereof has two functional groups.

In one embodiment, a gum base is made according to the above-described processes comprising reacting precursor repeat units comprising (1) at least one polyol having two or more hydroxyl groups or esters thereof; (2) at least one aliphatic polyfunctional acid or ester thereof having at least three functional groups; and (3) optionally at least one long chain aliphatic carboxylic acid or ester thereof.

Within this embodiment, the aliphatic polyfunctional acid or ester has three functional groups.

Within each of the above embodiments, the gum base can be aliphatic and biodegradable.

In another embodiment, any branched aliphatic biodegradable polyester or gum base described above exhibits a high degree of crosslinking and can be defined by comparing the highly crosslinked branched aliphatic polyesters of the instant invention to thermoset polymers. Thermoset polymers can be classified as "A-," "B-," and "C-stage" polymers according to the extent of the reaction, "p," as compared to the extent of the reaction at gelation, "pc." The polymer is an "A-stage" polymer if "p" is less than "pc." The polymer is a "B-stage" polymer if the system is close to the gel point, "pc." The polymer is a "C-stage" polymer if the polymer is well past "pc." The "A-stage" polymer is soluble and fusible. The "B-stage" polymer is still fusible but is barely soluble. The "C-stage" polymer is crosslinked and both infusible and insoluble. The crosslinked branched aliphatic biodegradable polyesters of the present invention fall between the "B- and C-stages" of the thermoset polymer classification. (See page 127 of Odian, *Principles of Polymerization,* referenced above). Preferred molecular weight ranges for branched aliphatic biodegradable polyester exhibiting high crosslinking is from about 100K to greater than about 1M, more preferably from about greater than 100K to about 10M "K" means one thousand and "M" means one million.

In another embodiment, the gum base has a molecular weight range of from about 100K to greater than about 1M. This molecular weight range inherently contemplates a high level of crosslinking i.e., insoluble in a solvent. As such, a molecular weight determination is likely precluded.

In another embodiment, the gum base has an acid value of from about 10 to about 500 mg KOH/g polymer.

In a preferred embodiment, the gum base comprises a crosslinked branched aliphatic biodegradable polyester gel comprising repeat units formed from (1) glycerol; (2) adipic acid; and (3) optionally palmitic acid.

In an even more preferred embodiment, the gum base comprises a crosslinked branched aliphatic biodegradable polyester gel comprising repeat units formed from (1) glycerol; (2) adipic acid; and (3) palmitic acid.

In an even more preferred embodiment, the gum base comprises a crosslinked branched aliphatic biodegradable polyester gel consisting of repeat units formed from (1) glycerol; (2) adipic acid; and (3) palmitic acid In another embodiment, a chewing gum composition formulated from any of the aforementioned gum bases.

The polyols, aliphatic or aromatic polyfunctional acids, long chain aliphatic carboxylic acid or aromatic monocarboxylic acids, additional units of alcohol, polyol or derivative thereof for the gum bases and compositions are the same as described above with respect to the process embodiments.

The insoluble gum base generally comprises elastomers, resins, fats and oils, softeners and inorganic fillers. The gum base may or may not include wax. The insoluble gum base can constitute from about 5 to about 95% by weight of the chewing gum. More commonly, the gum base comprises from about 10 to about 50% by weight of the gum, and in some preferred embodiments, from about 20 to about 35% by weight of the chewing gum.

In another embodiment, the invention provides that the gum base is wax-free, non tacky, or a bubble gum-type base.

In one embodiment, the chewing gum base of the present invention comprises from about 1 to 80% by weight crosslinked branched aliphatic biodegradable polyester, from about 20 to about 60% by weight synthetic elastomer, from about 0 to about 30% by weight natural elastomer, from about 5 to about 55% by weight elastomeric plasticizer, from about 4 to abut 35% by weight filler, from about 5 to about 35% by weight softener, and optional minor amounts (about 1% or less) of miscellaneous ingredients such as colorants, antioxidants, etc.

Synthetic elastomers may include, but are not limited to, polyisobutylene with a GPC weight average molecular weight of about 10,000 to about 95,000 isobutylene-isoprene copolymer (butyl elastomer), styrene-butadiene copolymers having styrene-butadiene ratios of about 1:3 to about 3:1, polyvinyl acetate having a GPC weight average molecular weight of about 2,000 to about 90,000, polyisoprene, polyethylene, vinyl acetate-vinyl laurate copolymer having a vinyl laurate content of from about 5 to about 50% by weight of the copolymer, and combinations thereof.

Preferred ranges are, for polyisobutylene, 50,000 to 80,000 GPC weight average molecular weight, for styrene-butadiene, 1:1 to 1:3 bound styrene-butadiene, for polyvinyl acetate, 10,000 to 65,000 GPC weight average molecular weight with the higher molecular weight polyvinyl acetates typically used in bubble gum base, and for vinyl acetate-vinyl laurate, vinyl laurate content of from about 10 to 45%.

If used, natural elastomers may include natural rubber such as smoked or liquid latex and guayule as well as natural gums such as jelutong, lechi caspi, perillo, sorva, massaranduba balata, massaranduba chocolate, nispero, rosindinha, chicle, gutta hang kang, and combinations thereof. The preferred synthetic elastomer and natural elastomer concentrations vary depending on whether the chewing gum in which the base is used is adhesive or conventional, bubble gum or regular gum, as discussed below. Preferred natural elastomers include jelutong, chicle, sorva, and massaranduba balata.

If used, elastomer plasticizers may include, but are not limited to natural rosin esters, often called estergums, such as glycerol esters of partially hydrogenated rosin, glycerol esters polymerized rosin, glycerol esters of partially dimerized rosin, glycerol esters of rosin, pentaerythritol esters of partially hydrogenated rosin, methyl and partially hydrogenated methyl esters of rosin, pentaerythritol esters of rosin; synthetics such as terpene resins derived from alpha-pinene, beta-pinene, and/or d-limonene; and any suitable combinations thereof. The preferred elastomer plasticizers will also vary depending on the specific application, and on the type of elastomer which is used.

Fillers/texturizers may include magnesium and calcium carbonate, ground limestone, silicate types such as magnesium and aluminum silicate, clay, alumina, talc, titanium oxide, mono-, di- and tri-calcium phosphate, cellulose polymers, such as wood, and combinations thereof.

Softeners/emulsifiers may include tallow, hydrogenated tallow, hydrogenated and partially hydrogenated vegetable oils, cocoa butter, glycerol monostearate, glycerol triacetate, lecithin, mono-, di- and triglycerides, acetylated monoglycerides, fatty acids, such as stearic, palmitic, oleic and linoleic acids and combinations thereof.

Colorants and whiteners may include FD&C-type dyes and lakes, fruits and vegetable extracts, titanium dioxide and combinations thereof.

The gum base may or may not include wax. An example of a wax-free gum base is disclosed in U.S. Pat. No. 5,286,500, the disclosure herein which is incorporated by reference.

In addition to a water insoluble gum base portion, a typical chewing gum composition includes a water soluble bulk portion and one or more flavoring agents. The water soluble portion can include bulk sweeteners, high intensity sweeteners, flavoring agents, softeners, emulsifiers, colors, acidulant, fillers, antioxidants, and other components that provide desired attributes.

The softeners, which are also known as plasticizers and plasticizing agents, generally constitute from about 0.5 to about 15% by weight of the chewing gum. The softeners may include glycerin, lecithin, and combinations thereof. Aqueous sweetener solutions such as those containing sorbitol, hydrogenated starch hydrosylates, corn syrup and combinations thereof, may also be used as softeners and binding agents in chewing gum.

Bulk sweeteners include both sugar and sugarless components. Bulk sweeteners typically constitute from about 5 to about 95% by weight of the chewing gum, more preferably 20 to 80% by weight, and even more preferably, 30 to 60% by weight of the gum.

Sugar sweeteners generally include saccharide-containing components commonly known in the chewing gum art, including, but not limited to, sucrose, dextrose, maltose, dextrin, dried invert sugar, fructose, galactose, corn syrup solids, and the like, alone or in combination.

Sorbitol can be used as a sugarless sweetener. Additionally, sugarless sweeteners can include, but are not limited to other sugar alcohols, such as mannitol, hydrogenated isomoltulose (palatinit), xylitol, hydrogenated starch hydrosylates, malitol, lactitol and the like, alone or in combination.

High intensity artificial sweeteners can also be used in combination with the above. Preferred sweeteners include, but are not limited to sucralose, aspartame, salts of acesulfame, alitame, saccharin and its salts, cyclamic acid and its salts, glycyrrhizin, dihydrochalcones, thaumatin, monellin, and the like, alone or in combination. In order to provide longer lasting sweetness and flavor perception, it may be desirable to encapsulate or otherwise control the release of at least a portion of the artificial sweetener. Such techniques as wet granulation, wax granulation, spray drying, spray chilling, fluid bed coating, coacervation, and fiber extrusion may be used to achieve the desired release characteristics.

Usage level of the artificial sweetener will vary greatly and will depend on such factors as potency of the sweetener, rate of release, desired sweetness of the product, level and type of flavor used and cost considerations. Thus, the active level of artificial sweetener may vary from about 0.02 to about 8%. When carriers used for encapsulation are included, the usage level of the encapsulated sweetener will be proportionately higher.

Combinations of sugar and/or sugarless sweeteners may be use in chewing gum. Additionally, the softener may also provide artificial sweetness such as with aqueous sugar or alditol solutions.

If a low calorie gum is desired, a low caloric bulking agent can be used. Examples of low caloric bulking agents include, polydextrose, Raftilose, Raftilin, Fructooligosaccharides (Nutra Flora); Palatinose oligosaccharide, Guar gum hydrosylate (Sun Fiber) or indigestible dextrin (Fibersol). However, other low calorie bulking agents can be used.

A variety of flavoring agents can be used. The flavor can be used in amounts of from about 0.1 to about 15% weight of the gum, and preferably from about 0.2 to about 5% weight. Flavoring agents may include essential oils, synthetic flavors or mixtures thereof, including, but not limited to oils derived from plants and fruits, such as citrus oils, fruits essences, peppermint oil, spearmint oil, other mint oils, clove oil, oil of wintergreen, anise and the like. Artificial flavoring agents and components may also be used. Natural and artificial flavoring agents may be combined in any sensorially acceptable fashion.

The present invention, can be used with a variety of processes for manufacturing chewing gum. Chewing gum is generally manufactured by sequentially adding the various chewing gum ingredients to commercially available mixers known in the art. After the ingredients have been thoroughly mixed, the chewing gum mass is discharged from the mixer and shaped into the desired form, such as by rolling into sheets and cutting into sticks, extruding into chunks, or casting into pellets.

Generally, the ingredients are mixed by first softening the gum base and adding it to the running mixer. The gum base may alternatively be softened by heating in an appropriate vessel. Color and emulsifiers can be added at this time.

A chewing gum softener, such as glycerin can be added next along with part of the bulk portion. Further parts of the bulk portion may then be added to the mixer. Flavoring agents are typically added with the final part of the bulk portion. The entire mixing process typically takes from five to fifteen minutes, although longer mixing times are sometimes required.

The following examples are put forth so as to provide one of ordinary skill in the art with a complete disclosure and description of how the process and product claimed herein are made and evaluated and are intended to be purely exemplary of the invention and are not intended to limit the scope of what the inventor regards as their invention. Efforts have been made to insure accuracy with respect to numbers (e.g. amounts, temperature, etc.) but some errors and deviations should be accounted for. Unless indicated otherwise, parts are by weight, temperature is in ° C. or is at room temperature and pressure is at or near atmospheric.

COMPARATIVE EXAMPLE 1

Preparation of Adipic Acid/Glycerol Gum

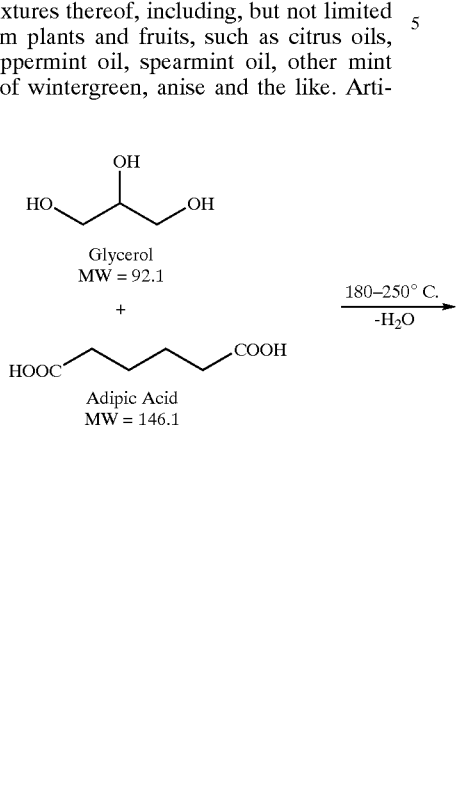

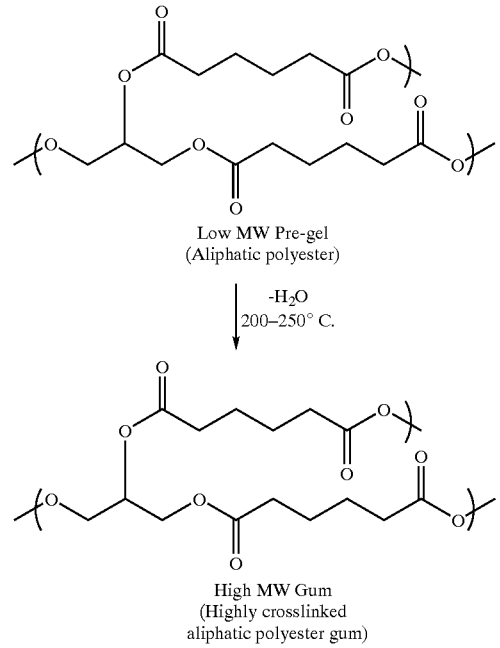

To a 1-liter heated resin kettle equipped with agitator, thermometer, and condenser with distillation head, 294 g (9.64 equivalents) of glycerol was added. The glycerol was agitated and heated to about 100° C., and 704 g (9.64 equivalents) of adipic acid was added. After all the adipic acid was added, the batch was heated to 150–200° C. and water was taken off at atmospheric pressure. Water began to distill when the temperature of the reaction mixture reached 150 to 160° C. The batch was heated further to 160 to 210° C. and water taken off until the batch gelled. Gelation began to occur after about 134 g of the water was collected. The 134 g of water collected was 77% of the theoretical amount. Depending upon the level of post-gelation heating, the product had a consistency ranging from a sticky gum containing about 15% by weight of a water-soluble fraction to that of a somewhat hard glass with a water-soluble fraction of 1% or less.

COMPARATIVE EXAMPLE 2

Preparation of Adipic Acid/Glycerol Pre-gel

To a 1-liter heated resin kettle equipped with agitator, thermometer, and condenser with distillation head, 294 g (9.64 equivalents) of glycerol was added. The glycerol was agitated and heated to about 100° C., and 704 g (9.64 equivalents) of adipic acid was added. After all the adipic acid was added, the batch was heated to 150–200° C. and water taken off at atmospheric pressure. Water began to distill when the temperature of the reaction mixture reached 150 to 160° C. The batch was heated further heated to 160 to 210° C., and water collected until a total of 110 g was obtained. The 110 g of water collected was 63% of the theoretical amount.

COMPARATIVE EXAMPLE 3

Reactive Extrusion to Yield Adipic Acid/Glycerol Gum

The pre-gel from Example 2 was heated to 80–100° C. in a metering tank, whereupon it liquefied. It was then fed into the extruder. Water vapor formed during the extrusion process was vented to the atmosphere. The hot gum exiting from the extruder was collected, cooled, and packaged.

| | |
|---|---|
| Extruder description: | Werner & Pfleiderer 30 mm |
| | Co-rotating, intermeshing twin screws |
| | L:D* = 40:1 |
| | Equipped with nitrogen purge |
| | No vacuum used |
| Extrusion conditions: | Operating temperature = 260–265° C. |
| | Screw speed = 70 rpm |
| | Feed rate = 17 lb/hr |
| | ATM vent at barrel #12 |
| | Nitrogen flow = 75 scfh |
| | L:D* = 24:1 |

*L:D ratio changed by moving point of addition of feed.

COMPARATIVE EXAMPLE 4

Preparation of Adipic Acid/Glycerol/Palmitic Acid Gum (22 wt % Palmitic Acid)

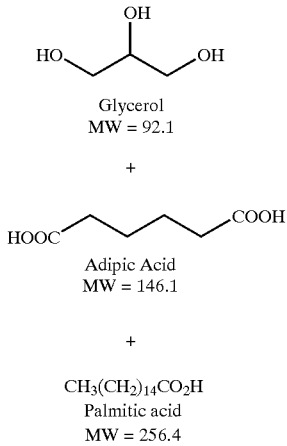

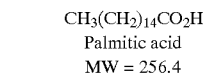

To a 5-liter heated resin kettle equipped with agitator, thermometer, and condenser with distillation head, 1246 g (40.6 equivalents) of glycerol was added. The glycerol was agitated and heated to about 100° C., and 1068 g (4.2 equivalents) of palmitic acid was added. While maintaining the batch temperature at 100–120° C., 2506 g (34.3 equivalents) of adipic acid was added. The batch was heated to 150 to 210° C. and water of reaction taken off at atmospheric pressure.

Water began to distill when the temperature of the reaction mixture reached 150 to 160° C. The batch was heated further to 160–210° C. and water taken off until the batch gelled. Gelation began to occur after about 534 g of the water was collected. The 534 g of water collected was 77% of the theoretical amount. Depending upon the level of post-gelation heating, the product had a consistency ranging from a sticky gum containing about 10% by weight of a water-soluble fraction to that of a somewhat hard glass with a water-soluble fraction of 1% or less.

COMPARATIVE EXAMPLE 5

Preparation of Adipic Acid/Glycerol/Palmitic Acid Pre-gel (22 wt % Palmitic Acid)

To a 5-liter heated resin kettle equipped with agitator, thermometer, and condenser with distillation head, 1246 g (40.6 equivalents) of glycerol was added. The glycerol was agitated and heated to about 100° C., and 1068 g (4.2 equivalents) of palmitic acid was added. While maintaining the batch temperature at 100–120° C., 2506 g (34.3 equivalents) of adipic acid was added. The batch was heated to 150–210° C. and water of reaction was collected at atmospheric pressure. Water began to distill when the temperature of the reaction mixture reached 150–160° C. The batch was heated further and water collected until a total of 437 g was obtained. The 437 g of water collected was 63% of the theoretical amount (693 g).

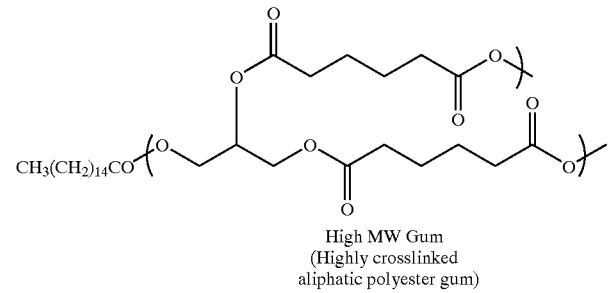

COMPARATIVE EXAMPLE 6

Reactive Extrusion to Yield Gum

The pre-gel from Example 5 was liquefied by heating from 100 to 120° C. in a metering tank. It was then fed into the extruder. Water vapor formed during the extrusion process was vented to the atmosphere. The hot gum exiting from the extruder was collected, cooled, and packaged.

| Extruder description: | Werner & Pfleiderer 30 mm |
| --- | --- |
| | Co-rotating, intermeshing twin screws |
| | L:D* = 40:1 |
| | Equipped with nitrogen purge |
| | No vacuum used |
| Extrusion conditions: | Operating temperature = 260–270° C. |
| | Screw speed = 70 rpm |
| | Feed rate = 8–10 lb/hr |
| | ATM vent at barrel #12 |
| | Nitrogen flow = 90 scfh |
| | L:D* = 24:1 |

*L:D ratio changed by moving point of addition of feed.

COMPARATIVE EXAMPLES 7 AND 8

Adipic Acid/Glycerol/Palmitic Acid Pre-gels

Using the same procedure as described above, the following examples were prepared:

| Sample | Adipic acid | Glycerol | Palmitic acid | Water collected | Theoretical amt. of water |
| --- | --- | --- | --- | --- | --- |
| Example 7 | 895 g | 478 g | 646 g (32 %)[a] | 136 g (63%) | 215 g |
| Example 8 | 832 g | 460 g | 727 g (36 %) | 133 g (63%) | 212 g |

[a]Percent by weight of total ingredients

COMPARATIVE EXAMPLE 9

Reactive Extrusion to Yield Gum

The pre-gels from Examples 7–8 were liquefied by heating from 100 to 120° C. in a metering tank. It was then fed into the extruder. Water vapor formed during the extrusion process was vented to the atmosphere. The hot gum exiting from the extruder was collected, cooled, and packaged.

| Extruder description: | Readco 2.0 inch |
| --- | --- |
| | Co-rotating, intermeshing twin screws |
| | L:D* = 8.5:1 |
| | Equipped with nitrogen purge |
| | No vacuum used |
| | Vent located ⅓ barrel length from discharge |
| Extrusion conditions: | Operating temperature = 250–270° C. |
| | Screw speed = 200 rpm |
| | Feed rate = 10–12 lb/hr |
| | ATM vent at barrel #12 |
| | Nitrogen flow = 30 scfh |
| | L:D* = 8.5:1 |

*L:D ratio changed by moving point of addition of feed.

EXAMPLE 10

Preparation of a Gum from Adipic Acid/Glycerol/
Palmitic Acid (22 wt % Palmitic Acid) Pre-gel via
a Two-part Process To a 3-liter flask equipped with agitator, heating mantle, thermometer, and distillation setup, 450 g (1.76 equivalents), palmitic acid, 261 g (8.51 equivalents) glycerol, and 1048 g (14.36 equivalents) adipic acid were added. The batch was heated at 150–2000 C., whereupon water of reaction began to distill. Heating was continued until water production had essentially stopped. Of the theoretical 153 g of water, a total of 132 g of water was collected, which was 86%. At 100–120° C., the batch remained a thick but stirrable liquid and did not gel.

To achieve gelation, 260 g (8.47 equivalents) of glycerol was added to the above reaction mixture and the batch heated to 200° C., and the batch gelled after 75 minutes. A total of 96 g of water was collected during the second heating period.

EXAMPLE 11

Preparation of a Gum from Adipic Acid/Glycerol/
Palmitic Acid (22 wt % Palmitic Acid) Pre-gel via
a Two-part Process and Vacuum To a 3-liter flask equipped with agitator, heating mantle, thermometer, and vacuum distillation setup, 356 g (1.39 equivalents) palmitic acid, 208 g (6.78 equivalents) glycerol, and 836 g (11.45 equivalents) adipic acid were added. The batch was heated at 160–165° C., whereupon water of reaction began to distill. The pressure was gradually reduced while maintaining the reaction temperature at 160–165° C. Heating was continued until water production had essentially stopped. Of the theoretical 122 g of water, a total of 95 g (78% theoretical) of water was collected. At 100–120° C., the batch remained a thick but stirrable liquid and did not gel.

To achieve gelation, 208 g of glycerol (6.78 equivalents) was added to the above reaction mixture and the batch was heated at 160–165° C. under vacuum (25–50 mm Hg), whereupon the batch gelled after 310 minutes. A total of 78 g of water was collected during the second heating period.

EXAMPLE 12

Preparation of a gum from Adipic Acid/Glycerol/
Palmitic Acid (22 wt % Palmitic Acid) Pre-gel via
a Two-part Process and Vacuum To a 3-liter flask equipped with agitator, heating mantle, thermometer, and vacuum distillation setup, 356 g (1.39 equivalents) palmitic acid, 416 g (13.57 equivalents) glycerol, and 500 g (6.85 equivalents) adipic acid were added. The batch was heated at 160–165° C., whereupon water of reaction began to distill. The pressure was gradually reduced while maintaining the reaction temperature at 160–165° C. Heating was continued until water production had essentially stopped. Of the theoretical 148 g of water, a total of 97 g (65% theoretical) of water was collected. At 100–120° C., the batch remained a thick but stirrable liquid and did not gel.

To achieve gelation, 336 g (4.60 equivalents) adipic acid was added to the above reaction mixture and the batch heated at 160–165° C. under vacuum (25–50 mm Hg), whereupon the batch gelled after 175 minutes. A total of 37 g of water was collected during the second heating period.

EXAMPLE 13

Preparation of a Gum from Adipic Acid/Glycerol/
Palmitic Acid (22 wt % Palmitic Acid) Pre-gel via
a Two-part Process To a 3-liter flask equipped with agitator, heating mantle, thermometer, and distillation setup, 450 g (1.76 equivalents)

palmitic acid, 380 g (12.39 equivalents) glycerol, and 370 g (5.07 equivalents) adipic acid were added. The batch was heated at 150–200° C., whereupon water of reaction began to distill off. Heating was continued until water production had essentially stopped. Of the theoretical 123 g of water, a total of 109 g of water was collected, which was 89%. At 100–120° C., the batch remained a thick but stirrable liquid and did not gel. This pre-gel composition had hydroxyl-rich end groups.

A pre-gel composition having carboxyl end groups was made in the following manner. To a 2-liter flask equipped with agitator, heating mantle, thermometer, and distillation setup, 141 g (4.60 equivalents) glycerol, and 678 g (9.29 equivalents) adipic acid were added. The batch was heated at 150–200° C., whereupon water of reaction began to distill. Heating was continued until water production had essentially stopped. Of the theoretical 83 g of water, a total of 72 g of water was collected, which was 87%. At 100–120° C., the batch remained a thick but stirrable liquid and did not gel. This pre-gel composition had carboxyl-rich end groups.

To achieve gelation, 500 grams of the pre-gel composition having hydroxyl-rich end groups was mixed with 342 g of the pre-gel composition having carboxyl-rich end groups and the mixture heated rapidly to 200° C. Gelation began to occur after maintaining temperature at 200° C. for 65 minutes. A total of 23 g of water was collected during this final stage of heating.

EXAMPLE 14

Preparation of a Gum from Adipic Acid/Glycerol/ Palmitic Acid Gum (22 wt % Palmitic Acid) Pre-gel via a Two-part Process To a 3-liter flask equipped with agitator, heating mantle, thermometer, and distillation setup, 325 g (1.27 equivalents) palmitic acid, 380 g (12.39 equivalents) glycerol, and 500 g (6.85 equivalents) adipic acid were added. The batch was heated at 150–200° C., whereupon water of reaction began to distill. Heating was continued until water production had essentially stopped. Of the theoretical 146 g of water, a total of 123 g of water was collected, which was 84%. At 100–120° C., the batch remained a thick but stirrable liquid and did not gel. This pre-gel composition had hydroxyl-rich end groups.

A pre-gel composition having carboxyl-rich end groups was made in the following manner. To a 2-liter flask equipped with agitator, heating mantle, thermometer, and distillation setup, were placed: 125 g (0.49 equivalents) palmitic acid, 141 g (4.60 equivalents) glycerol, and 548 g (7.51 equivalents) adipic acid were added. The batch was heated at 150–200° C., whereupon water of reaction began to distill. Heating was continued until water production had essentially stopped. Of the theoretical 83 g of water, a total of 72 g of water was collected, which was 82%. At 100–120° C., the batch remained a thick but stirrable liquid and did not gel. This pre-gel composition had carboxyl-rich end groups.

To achieve gelation, 800 grams of the pre-gel composition having hydroxyl-rich end groups was mixed with 548 g of the pre-gel composition having carboxyl-rich end groups and the mixture heated rapidly to 200° C. Gelation began to occur after maintaining the mixture at a temperature of 200° C. for 47 minutes. A total of 16 g of water was collected during this final stage of heating.

EXAMPLE 15

Preparation of a Gum from Adipic Acid/Glycerol/ Palmitic Acid (22 wt % Palmitic Acid) Pre-gel via a Two-part Process and Vacuum To a 2-liter flask equipped with agitator, heating mantle, thermometer, and distillation setup, 250 g (0.98 equivalents) palmitic acid, 300 g (9.78 equivalents) glycerol, and 380 g (5.20 equivalents) adipic acid were added. The batch was heated at 150–200° C., whereupon water of reaction began to distill. Heating was continued until water production had essentially stopped. The pressure was gradually reduced while maintaining the reaction temperature at 180–185° C. Heating was continued until water production had essentially stopped. Of the theoretical 111 g of water, a total of 94 g of water was collected, which was 85%. At 100–120° C., the batch remained a thick but stirrable liquid and did not gel. This pre-gel composition had hydroxyl-rich end groups.

A pre-gel composition having carboxyl-rich end groups was made in the following manner. To a 2-liter flask equipped with agitator, heating mantle, thermometer, and distillation setup, 200 g (0.78 equivalents) palmitic acid, 176 g (5.73 equivalents) glycerol, and 600 g (8.23 equivalents) adipic acid were added. The batch was heated at 150–200° C., whereupon water of reaction began to distill. The pressure was gradually reduced while maintaining the reaction temperature at 180–185° C. Heating was continued until water production had essentially stopped. Of the theoretical 103 g of water, a total of 95 g of water was collected, which was 92%. At 100–120° C., the batch remained a thick but stirrable liquid and did not gel. This pre-gel composition had carboxyl-rich end groups.

To achieve gelation, 700 grams of the pre-gel composition having hydroxyl-rich-end groups was mixed with 778 g of the pre-gel composition having carboxyl-rich end groups and the mixture heated rapidly to 200° C. Gelation occurred after the mixture was maintained at 200° C. for 19 minutes. A total of 5 g of water was collected during this final stage of heating.

EXAMPLE 16

Preparation of a Gum from Adipic Acid/Glycerol/ Palmitic Acid (22 wt % Palmitic Acid) Pre-gel via a Two-part Process and Vacuum To a 2-liter flask equipped with agitator, heating mantle, thermometer, and distillation setup, 225 g (0.88 equivalents) palmitic acid, 349 g (11.38 equivalents) glycerol, and 440 g (6.03 equivalents) adipic acid were added. The batch was heated at 150–200° C., whereupon water of reaction began to distill. Heating was continued until water production had essentially stopped. The pressure was gradually reduced while maintaining the reaction temperature at 180–200° C. Heating was continued until water production had essentially stopped. Of the theoretical 124 g of water, a total of 118 g of water was collected, which was 95%. At 100–120° C., the batch remained a thick but stirrable liquid and did not gel. This pre-gel composition had hydroxyl-rich end groups.

A pre-gel composition having carboxyl-rich end groups was made in the following manner. To a 2-liter flask equipped with agitator, heating mantle, thermometer, and distillation setup, 225 g (0.88 equivalents) palmitic acid, 172 g (5.61 equivalents) glycerol, and 608 g (8.33 equivalents) adipic acid were added. The batch was heated at 150–200° C., whereupon water of reaction began to distill. The pressure was gradually reduced while maintaining the reaction temperature at 180–200° C. Heating was continued until water production had essentially stopped. Of the theoretical 101 g of water, a total of 95 g of water was collected, which was 94%. At 100–120° C., the batch remained a thick but stirrable liquid and did not gel. This pre-gel composition had carboxyl-rich end groups.

To achieve gelation, 600 grams of the pre-gel composition having hydroxyl-rich-end groups was mixed with 609 g of the pre-gel composition having carboxyl-rich end groups and the mixture heated rapidly to 200° C. Gelation of the mixture occurred after being maintained at t temperature of 200° C. for 21 minutes. A total of 2 g of water was collected during this final stage of heating.

EXAMPLE 17

Preparation of a Gum from Adipic Acid/Glycerol/ Palmitic Acid (36 wt % Palmitic Acid) Pre-gel via a Two-part Process and Vacuum To a 5-liter flask equipped with agitator, heating mantle, thermometer, and distillation setup, 726 g (2.84 equivalents) palmitic acid, 584 g (19.04 equivalents) glycerol, and 710 g (9.73 equivalents) adipic acid were added. The batch was heated at 150–200° C., whereupon water of reaction began to distill. Heating was continued until water production had essentially stopped. Pressure was gradually reduced while maintaining the reaction temperature at 180–200° C. Heating was continued until water production had essentially stopped. Of the theoretical 226 g of water, a total of 212 g of water was collected, which was 94%. At 100–120° C., the batch remained a thick but stirrable liquid and did not gel. This pre-gel composition had hydroxyl-rich end groups.

A pre-gel composition having carboxyl-rich end groups was made in the following manner. To a 5-liter flask equipped with agitator, heating mantle, thermometer, and distillation setup, 726 g (2.84 equivalents) palmitic acid, 336 g (10.96 equivalents) glycerol, and 954 g (13.07 equivalents) adipic acid were added. The batch was heated at 150–200° C., whereupon water of reaction began to distill. The pressure was gradually reduced while maintaining the reaction temperature at 180–200° C. Heating was continued until water production had essentially stopped. Of the theoretical 197 g of water expected, a total of 181 g (92%) of water was collected. At 100–120° C., the batch remained a thick but stirrable liquid and did not gel. This pre-gel composition had carboxyl-rich end groups.

To achieve gelation, 700 grams of the pre-gel composition having hydroxyl-rich end groups was mixed with 700 g of the pre-gel composition having carboxyl-rich end groups and the mixture heated rapidly to 200° C. Gelation of the mixture occurred after being maintained at a temperature of 200° C. for 22 minutes. A total of 11 g of water was collected during this final stage of heating.

It will be apparent to those skilled in the art that various modifications and variations can be made without departing from the scope of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed:

1. A process for making a crosslinked branched polyester gel comprising:
    a) providing a first pre-gel composition having carboxyl end groups, wherein the first pre-gel composition is prepared by reacting:
        (1) at least one polyol having three or more hydroxyl groups or esters thereof;
        (2) at least one aliphatic or aromatic polyfunctional acid or ester thereof, or a mixture thereof; and
        (3) optionally, at least one long chain aliphatic carboxylic acid or ester thereof, or aromatic monocarboxylic acid or ester thereof, or mixture thereof, wherein components (1), (2), and, optionally (3) are reacted to substantial completion in a first reactor, thereby providing a first pre-gel composition.
    b) providing a second pre-gel composition having hydroxyl end groups, wherein the second pre-gel composition is prepared by reacting:
        (1) at least one polyol having three or more hydroxyl groups or esters thereof;
        (2) at least one aliphatic or aromatic polyfunctional acid or ester thereof, or a mixture thereof; and
        (3) optionally, at least one long chain aliphatic carboxylic acid or ester thereof, or aromatic monocarboxylic acid or ester thereof, or mixture thereof, wherein components (1), (2), and, optionally, (3) are reacted to substantial completion in a second reactor, thereby providing a second pre-gel composition;
    c) removing either or both of the first and second pre-gel compositions from their respective reactors;
    d) combining the first and second pre-gel compositions to form a mixture; and
    e) processing the mixture in an extruder, a continuous processor, or a container to convert the mixture into a crosslinked branched polyester gel.

2. The process of claim 1 wherein the aliphatic or aromatic polyfunctional acid or ester thereof has two functional groups.

3. The process of claim 1, wherein either or both of the reactors are stirred tank reactors.

4. The process of claim 1, wherein either or both of steps a) or b) is conducted in a batch-type process.

5. The process of claim 1, wherein either or both of steps a) or b) is conducted in a continuous process.

6. The process of claim 1, wherein either or both of steps a) or b) is conducted at from about 100° C. to about 300° C.

7. The process of claim 1, wherein either or both of steps a) or b) is conducted at ambient pressure.

8. The process of claim 1, further comprising between steps c) and d) introducing either or both of the first or second pre-gel compositions individually into separate additional stirred reactors wherein the additional reactors are each, independently, connected to a vacuum source, thereby providing further reaction of either or both of the first or second pre-gel compositions at reduced pressure, and removing either or both of the first or second pre-gel compositions from their respective additional stirred reactors.

9. The process of claim 8, wherein the reduced pressure is about 5 Torr.

10. The process of claim 1, further comprising applying a degassing step concurrently with either or both of steps a) or b).

11. The process of claim 10, wherein the degassing step is applied via a vacuum spray degasser.

12. The process of claim 10, wherein the degassing step is applied via a tray degasser.

13. The process of claim 1, wherein the mixture of first and second pre-gel compositions is introduced into an externally heated product container and crosslinked by curing.

14. The process of claim 13, wherein the container is heated at from about 50° C. to about 150° C. for from about 30 minutes to about 2 weeks.

15. The process of claim 13, further comprising cooling the mixture to from about 50° C. to about 300° C. prior to introducing the mixture into the container.

16. The process of claim 1, wherein the mixture of the first and second pre-gel compositions is either extruded or continuously processed for about less than 30 minutes at from about 25° C. to about 300° C.

17. The process of claim 16, further comprising introducing the mixture into a cooling apparatus or introducing the mixture into an additional extruder thereby lowering the temperature of the crosslinked branched polyester gel.

18. The process of claim 17, wherein after the temperature is lowered the crosslinked branched polyester is introduced into a container.

19. The process of claim 1, further comprising between steps c) and d) introducing the mixture of first and second pre-gel compositions into a wiped film still apparatus or a centrifugal still apparatus and reacting the mixture further.

20. The process of claim 1, wherein the polyol contains from 2 to 100 carbon atoms.

21. The process of claim 1, wherein the aliphatic or aromatic polyfunctional acid contains from 2 to 100 carbon atoms.

22. The process of claim 1, wherein either or both of the first or second pre-gel compositions further comprise repeat units formed from at least one long chain aliphatic carboxylic acid or an ester thereof or an aromatic monocarboxylic acid or ester thereof or mixture thereof.

23. The process of claim 22, wherein the long chain aliphatic carboxylic acid or ester thereof or aromatic monocarboxylic acid or ester thereof contains from 12 to 26 carbon atoms.

24. The process of claim 1, wherein either or both of the first or second pre-gel compositions further comprise repeat units formed from at least one monohydroxy alcohol.

25. The process of claim 1, wherein the polyol of either or both of steps a) or b) is selected from the group consisting of glycerol, pentaerythritol, polyglycol and polyglycerol; the aliphatic polyfunctional acid is selected from the group consisting of malonic, succinic, tartaric, malic, citric, fumaric, glutaric, adipic, pimelic, sebacic, suberic and azelaic acid; and the aromatic polyfunctional acid is selected from the group consisting of terephthalic, isophthalic, trimellitic, pyromellitic, naphthalene 1,4-, 2,3-, and 2,6-dicarboxylic acid.

26. The process of claim 1, wherein either or both of the first or second pre-gel compositions further comprise repeat units formed from an alcohol, a polyol, or a derivative thereof comprising ethylene glycol, propylene glycol, 1,3-butanediol, 1,2-propanediol, 1,3-propanediol, 1,4-butanediol, triacetin, trimethylolpropane, pentaerythritol, cellulose ether, cellulose ester, lauryl alcohol, myristyl alcohol, cetyl alcohol or stearyl alcohol.

27. The process of claim 1, wherein either or both of the first or second pre-gel compositions comprise repeat units formed from (1) glycerol, (2) adipic acid; and (3) palmitic acid.

28. A process for making a crosslinked branched polyester gel comprising:
   a) providing a first pre-gel composition having carboxyl end groups, wherein the first pre-gel composition is prepared by reacting:
      (1) at least one polyol having two or more hydroxyl groups or esters thereof;
      (2) at least one aliphatic or aromatic polyfunctional acid or ester thereof, or a mixture thereof having at least three functional groups; and
      (3) optionally, at least one long chain aliphatic carboxylic acid or ester thereof, or aromatic monocarboxylic acid or ester thereof, or mixture thereof, wherein components (1), (2), and, optionally, (3) are reacted to substantial completion in a first reactor, thereby providing a first pre-gel composition.
   b) providing a second pre-gel composition having hydroxyl end groups, wherein the second pre-gel composition is prepared by reacting:
      (1) at least one polyol having two or more hydroxyl groups or esters thereof;
      (2) at least one aliphatic or aromatic polyfunctional acid or ester thereof, or a mixture thereof having at least three functional groups; and
   (3) optionally, at least one long chain aliphatic carboxylic acid or ester thereof, or aromatic monocarboxylic acid or ester thereof, or mixture thereof, wherein components (1), (2), and, optionally, (3) are reacted to substantial completion in a second reactor, thereby providing a second pre-gel composition;
   c) removing either or both of the first and second pre-gel compositions from their respective reactors;
   d) combining the first and second pre-gel compositions to form a mixture; and
   e) processing the mixture in an extruder, a continuous processor, or a container to convert the mixture into a crosslinked branched polyester gel.

29. The process of claim 28, wherein the aliphatic or aromatic polyfunctional acid or ester thereof has three functional groups.

30. The process of claim 25, wherein component (3) is present in either or both of steps a) or b) and is selected from the group consisting of lauric, myristic, palmitic, stearic, aracidic, cerotic, dodecanoic, palmitoleic, oleic, linoleic and erucic acid; and the aromatic monocarboxylic acid is selected from the group consisting of benzoic, naphthoic and a substituted acid.

* * * * *